INVENTOR.
RUSH HAMILTON.
ATTORNEYS.

Patented Nov. 5, 1929

1,734,375

UNITED STATES PATENT OFFICE

RUSH HAMILTON, OF PIEDMONT, CALIFORNIA, ASSIGNOR TO STANDARD GAS ENGINE CO., OF OAKLAND, CALIFORNIA

GEAR AND BEARING ASSEMBLY FOR FORDSON TRACTORS

Application filed August 29, 1925. Serial No. 53,308.

The present invention relates to improvements in a tractor transmission and has particular reference to improvements in the transmission of a well known tractor. In the latter a change speed gear transmission is mounted in front of the differential transmission and motion is transmitted from one to the other by means of a worm extending from the change speed transmission rearwardly and engaging a large worm gear forming part of the differential. This arrangement has several undesirable features. In the first place the use of a worm involves considerable friction and produces heat particularly when the tractor is subjected to a heavy load at low speed. A further undesirable feature is that the speed reduction in the transmission from worm to worm gear is hardly sufficient to allow the tractor to work to best advantage. A further feature is that the worm being below the worm gear and the height of the axis of the worm gear being dependent on the height of the tractor wheels the distance between the worm or a housing surrounding the same and the ground surface is not always sufficient to give a desired clearance.

In the present invention it is proposed to change the arrangement by the substitution of a different means for transmitting motion from the change speed transmission to the differential transmission. It is proposed to provide two drives instead of the one worm drive which allows of a further reduction in the speed ratio and which tends to eliminate extreme heating under heavy loads. My arrangement offers the further advantage that the transmitting element does not extend under the large differential gear but engages the same from in front so that in the whole organism from crank shaft to differential there is no moving element that extends lower than the bottom line of the large differential gear. This, of course, allows of further clearance from the ground surface since the position of the large differential gear is determined by the size of the tractor wheels. In my arrangement the distance between the front and rear wheels is increased, a circumstance which tends to prevent the tractor from tilting under heavy loads.

Further objects and advantages of my device will appear as the specification proceeds.

The preferred form of my invention is illustrated in the accompanying drawings in which.

While I have shown only the preferred form of my invention, I wish to have it understood that various changes or modifications may be made within the scope of the claim hereto attached without departing from the spirit of the invention.

Figure 1:
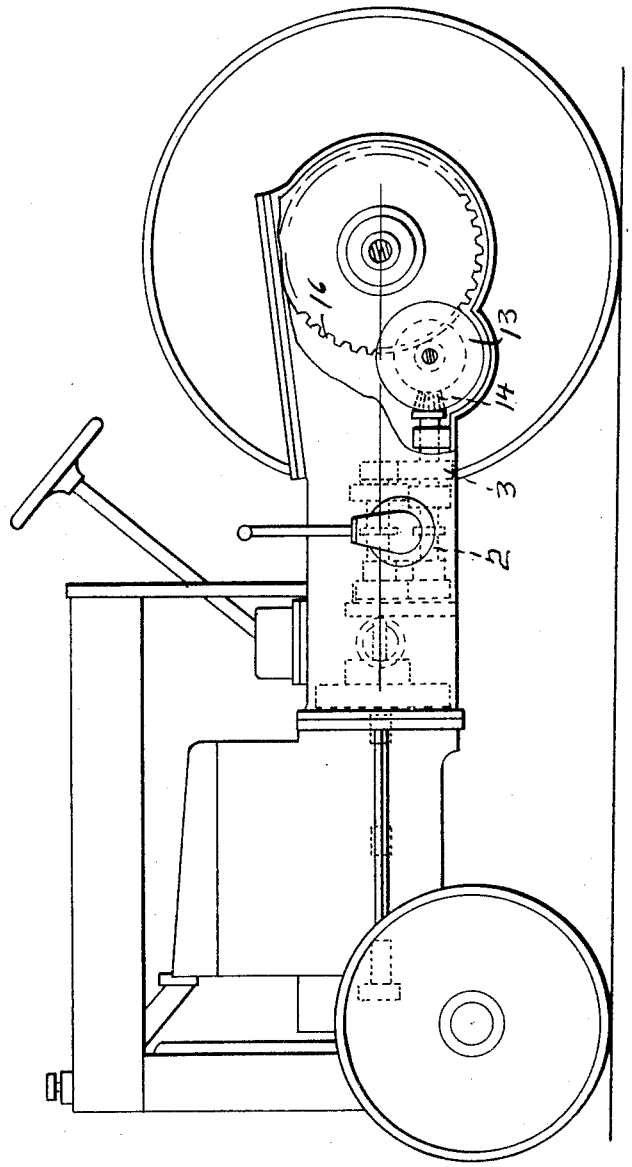
Figure 1 shows a side view of a tractor with part of the transmission shown in section.
Figure 2:
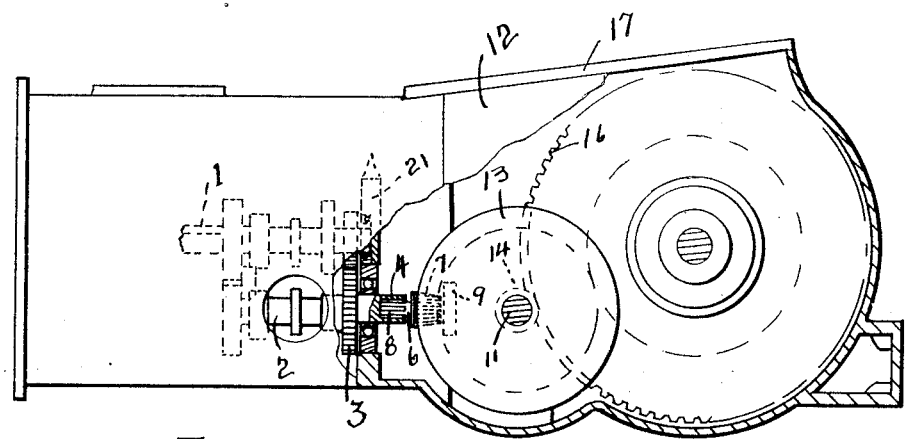
Figure 2 is an enlarged detail view partly in side elevation and partly in section of my transmitting means in connection with the change speed gear transmission and the differential transmission of a tractor.
Figure 3:
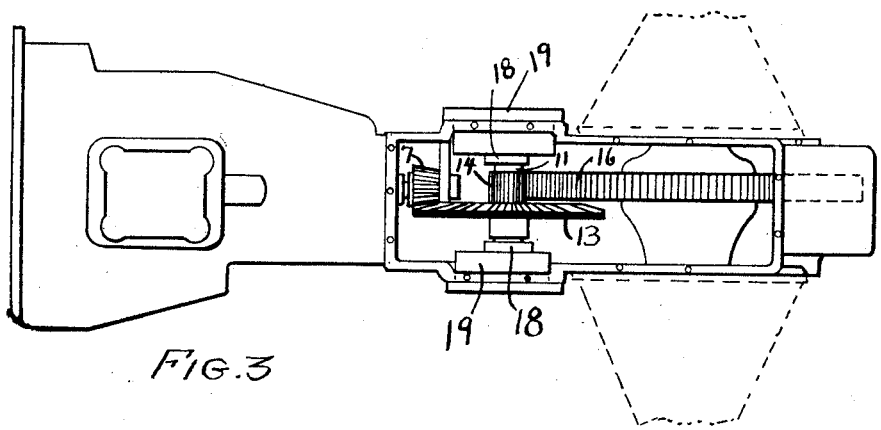
Figure 3 is a plan view of the mechanism shown in Figure 2.

The drive shaft 1 which is an extension of the crank shaft of the power plant has a short shaft 2 disposed underneath the rear end of the same with a change speed transmission shown in dotted lines allowing motion to be transmitted from the drive shaft 1 to a gear wheel 3 disposed on the short shaft 2 at various speed ratios. The gear wheel 3 has a sleeve 4 formed integral therewith and this sleeve is adapted to receive the front end of a shaft 6 at the rear end of which a bevel pinion 7 is secured. The shaft 6 is slidable in the sleeve 4 and has a driving connection therewith by means of splines 8. The rear end of the shaft 6 is supported in a bearing 9, and the speed transmission is adapted to be controlled by the usual lever-operated mechanism, indicated in Figure 1, so as to cause the shaft 6 to be non-rotating, or rotating at any required speed, according to the desire of the operator.

Transversely to the shaft 6 and rearwardly of the same a shaft 11 is supported in the housing 12 in such a manner that a bevel gear 13 fixed relative to the shaft meshes with the bevel pinion 7 and thereby transmits rotary motion to a small pinion 14 on the shaft 11 which latter pinion meshes with the large gear wheel 16 of the differential transmission.

From this latter gear wheel motion is transferred to the rear axle of the tractor by a well known arrangement not shown in the drawing.

As compared with the tractor which it is proposed to improve in the present invention the length of the housing 12 and the distance between the change speed gear transmission and the differential transmission is increased whereby the length of the tractor is increased. The means for transmitting motion from the change speed transmission to the differential transmission is accommodated entirely between the two so that it does not extend below the bottom of the large differential gear whereby the clearance under the housing is increased. The fact that the speed is reduced between the pinion 7 and the bevel gear 13, as well as between the pinion 14 and the large gear 16, allows of more speed reduction and increased power at the drawbar than is possible with the single worm transmission. The transmission in two stages, furthermore, effectively prevents over-heating under heavy loads.

Special attention should be called to the manner in which my device is assembled. The housing 12 is open on top and has a removable cover 17, the opening on top being sufficiently large to allow the large gear wheel 16 to be lowered therethrough. The transmitting unit including the shaft 11, the spur pinion 14 and the bevel gear 13 is also lowered through the open top, the two inner races 18 being fixed to the shaft and the two outer races or cages 19 being introduced through the sides of the housing to receive the inner races. A wall 21 is provided in the housing between the change speed gear mechanism and the differential and forms the rear support for the two shafts 1 and 2 of the change speed gear mechanism. The opening in the wall provided for accommodation of the sleeve 4 on the shaft 2 is sufficiently large to allow the pinion 7 to pass therethrough in advance of the sleeve.

Having described my invention, I claim:—

A chain speed transmission comprising a housing, spaced apart supports within the housing, one of the supports having an opening therethrough, a bushing within the opening, a driving shaft journaled in said support and above the opening, change speed gears carried by the driving shaft, a second shaft journaled in the said support, complementary change speed gears carried by the second shaft, one of the gears being affixed thereto and meshing with one of the gears on the driving shaft, the last named gear having an internally splined sleeve affixed thereto and journaled in the bushing, an externally splined stub shaft engaging the sleeve with one of its ends and journaled in the other of the supports at the other of its ends, a pinion affixed to the stub shaft, a shaft journaled transversely of the housing and spaced from the last named support, a driving gear affixed to the transverse shaft, a second shaft journaled in the housing and intermediate the transverse shaft and the last named support, a gear affixed to the last named shaft and in mesh with the driving gear and a beveled gear affixed to the last named shaft and meshing with the pinion.

In testimony whereof I affix my signature.

RUSH HAMILTON.